United States Patent [19]
Strathman

[11] 4,200,866
[45] Apr. 29, 1980

[54] STROKE WRITTEN SHADOW-MASK MULTI-COLOR CRT DISPLAY SYSTEM

[75] Inventor: Lyle R. Strathman, Cedar Rapids, Iowa

[73] Assignee: Rockwell International Corporation, El Segundo, Calif.

[21] Appl. No.: 885,843

[22] Filed: Mar. 13, 1978

[51] Int. Cl.[2] .............................................. G06K 15/20
[52] U.S. Cl. .................................... 340/703; 315/367; 340/739; 340/740
[58] Field of Search ........... 340/324 A, 324 AD, 701, 340/703, 704; 315/367

[56] References Cited

U.S. PATENT DOCUMENTS

| | | | |
|---|---|---|---|
| 3,471,847 | 10/1969 | McCollough et al. | 340/701 X |
| 3,577,031 | 5/1971 | McCormick et al. | 340/701 X |
| 3,668,686 | 6/1972 | Strohmeyer | 340/324 A |
| 3,775,760 | 11/1973 | Strathman | 340/324 A |
| 3,786,483 | 1/1974 | Sinobad | 340/701 |
| 3,836,890 | 9/1974 | Arkell | 340/324 A |

*Primary Examiner*—David L. Trafton
*Attorney, Agent, or Firm*—Richard W. Anderson; Richard A. Bachand; H. Fredrick Hamann

[57] ABSTRACT

A stroke writing generator develops selectively incremented and/or decremented horizontal and vertical deflection signals which simultaneously deflect all color associated beams of a conventional shadow-mask multicolor cathode ray tube to cause the beams to trace out a selected symbology on the tube screen. A video color code generator, operating in clock-defined synchronism with the stroke writing generator, selectively effects turn-on permutations of plural video amplifiers driving associated electron beams in the cathode ray tube to facilitate preprogrammed color tinting of the displayed symbology.

11 Claims, 5 Drawing Figures

STROKE WRITTEN SHADOW-MASK MULTI-COLOR CRT DISPLAY SYSTEM

Figure 1:
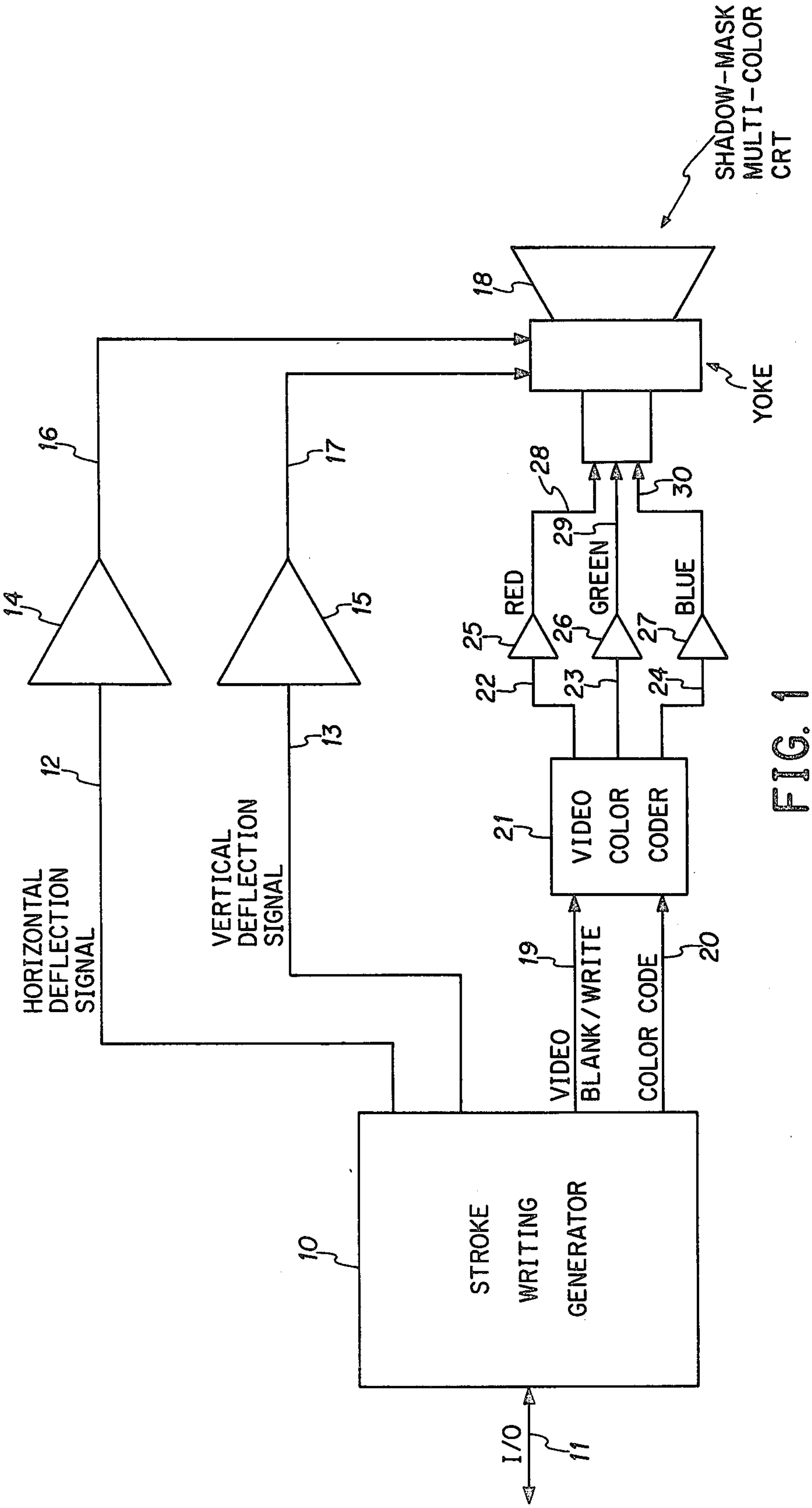

This invention relates generally to the display of graphics and symbology on a cathode ray tube screen, and more particularly to a means of generating and displaying selectively colored stroke-written symbology on a conventional shadow-mask multi-color cathode ray tube.

The art of stroke writing on monochrome cathode ray tubes has been widely developed. State of the art stroke writing systems are digital in nature, and provide for displaying a selected imagery on a cathode ray tube by defining the imagery as a sequence of straight-line strokes of predetermined length and line slope. Horizontal and vertical deflection signals are developed as running digital counts in respective binary counters, with digital-to-analog conversion of these running binary counts providing analog deflection signals to control the deflection of the cathode ray tube beam in a manner that the selected character or imagery is written on the screen much in the manner of writing a symbology with a pen and a piece of paper.

The advantages of stroke writing on a cathode ray tube reside in the inherently greater duty cycle with attendant increased beam on-time which is realized in writing the characters. It is known that, for a particular desired brightness of image display, stroke writing systems may employ appreciably lower cathode ray tube beam currents than those necessary to produce the same brightness of images on cathode ray tubes employing conventional raster scan displays.

Thus prior art systems have clearly indicated and exploited the feasibility of stroke writing on monochrome cathode ray tubes.

The obvious advantages of displaying symbology in the color domain are also well known in the art. In known raster scan/multi-color shadow-mask tube systems, symbology to be displayed is stored as digitized control signals for the colored cathode ray tube beams which are synchronized with the raster scan deflection circuitry employed. Such systems, while operating effectively to display symbology in a multi-color format, require extensive memory systems and complex interface synchronization with the raster scan deflection circuitries. Further as concerns raster scanned multicolor symbology display, the displayed symbols do not enjoy the sharpness and brightness of symbology written by stroke writing techniques. Further, such systems, in employing shadow-mask multi-color cathode ray tubes, suffer from the same disadvantage inherent in color cathode ray tubes, in that a large portion of the beam current impinges on the shadow-mask and high-beam currents are necessary to enjoy a high-brightness display.

In addition to the known technique of raster-scan writing on shadow-mask multi-color CRT's , multicolor stroke written displays have employed a variety of techniques. Among such known techniques are the employment of cathode ray tubes utilizing penetration phosphors, current sensitive phosphors, refresh-sensitive phosphors, and the employment of band-pass filters with broadband phosphors.

The penetration phosphor technique is based on the utilization of a phosphor whereby the color displayed is a function of cathode ray tube anode voltage. However, low anode voltage color in such systems is not as bright as high anode voltage color, resulting in a disadvantageous non-uniform brightness when displaying a variety of colors. Further the deflection gain employed in such systems must be adjusted as a function of anode voltage and, for high-speed color changes, the anode voltage power supply must switch the anode voltage in an extremely fast manner with attendant high power dissipation. In general, multi-color stroke written displays employing penetration phosphor cathode ray tubes suffer from high power dissipation, high cost, and display unit volumetric requirement greater than monochrome or shadow-mask color displays, and such techniques are limited currently to two colors, and mixtures thereof.

In color stroke writing systems employing current sensitive phosphors, where color displayed is a function of cathode ray tube beam current, the low beam current colored data is extremely dim, and only two colors and mixtures thereof are presently available.

In systems employing refresh sensitive phosphors, color is a function of refresh rate on a mixture of a short-decay phosphor with a long-decay phosphor. In such systems, however, the color associated with the long-decay phosphor is not adaptable to rapid data movement on the cathode ray tube screen, with the result that rapidly moving data displays are smeared. Additionally, such systems have a noticeable flicker of data drawn on the screen, due to the low refresh phosphor employed.

In systems employing band-pass filters with broadband phosphors, display is limited to one color at a time and the systems are generally clumsy, cumbersome, and cannot be electronically controlled.

Prior art techniques as to the display of symbology on cathode ray tubes has thus generally fallen into categories of monochrome raster; monochrome stroke writing; color raster; and color stroke writing employing techniques such as use of penetration, current sensitive and refresh sensitive phosphor tubes, as well as broadband phosphors with band-pass filters. In the known prior art, stroke writing has been associated with monochrome CRT's and with penetration, current sensitive, refresh sensitive and band-pass filter multi-color CRT's. Shadow-mask multi-color CRT's have been associated only with raster-scan display systems.

The shadow-mask multi-color cathode ray tube, as widely employed in the television industry, has been a development of the television industry and employs a standard raster-scan display technique. As such, it has been assumed that a shadow-mask multi-color CRT tube, such as commonly employed in the television industry, must employ a raster scan beam deflection system in order to enjoy color definition. The assumption has been that a raster scan deflection system critically aligned with the geometry of the shadow-mask is a prerequisite for maintenance of color definition. As such, the known advantages of stroke written symbology on a cathode ray tube have not been enjoyed in the color domain. Those skilled in the art of stroke writing have assumed that multi-color shadow-mask cathode ray tubes may not be employed with stroke writing deflection systems, since, in stroke writing systems, the beam is caused to be deflected in numerous directions, and the only vector employed in a raster scan deflection system is that of successive lines written from left to right across the face of the tube, and in fixed geometrical alignment with the tube shadow-mask.

I have found, however, that, although it has previously been considered that stroke writing techniques may not be employed with shadow-mask cathode ray tubes, shadow-mask multi-color cathode ray tubes may be stroke written without color loss or misalignment. This possibility was observed when the yoke of a raster-scan written shadow-mask cathode ray tube color display was rotated and the observed display showed no signs of color loss or misalignment, whereupon a stroke writing symbol generator and deflection system subsequently applied to a shadow-mask multi-color cathode ray tube resulted in an observed display which had all the characteristics of multi-color stroke written information with attended advantage of definition, brightness, and power saving. It is thus apparent that stroke writing in color on a multi-color shadow-mask cathode ray tube is possible, in that the beams of a shadow mask cathode ray tube are never totally hidden or blocked by the shadow-mask and that, additionally, the convergence system, once set up, is independent of the beam scanning method employed.

Accordingly, the primary object of the present invention is to provide a stroke written shadow-mask multi-color cathode ray tube display system.

A further object of the present invention is the provision of a system for displaying color-coded graphical and symbolic information employing stroke writing deflection techniques.

Another object of the present invention is to provide an improved symbology display system operating in the color domain and providing improved display resolution, accuracy and definition over raster converted and scanned graphical displays.

A still further object of the present invention is the provision of a symbology display system on a multi-color cathode ray tube which provides a wider range of color coded display information than is permissible in multi-color display systems utilizing voltage sensitive penetration phosphors, current density sensitive phosphors, or refresh rate and writing rate sensitive phosphors.

Another object of the present invention is the provision of a multi-color symbology display system providing higher brightness and contrast than is possible with conventional raster scanned shadow-mask multi-color cathode ray tube displays or stroke written voltage sensitive penetration phosphor CRT displays.

Another object of the present invention is the provision of a multi-color symbology display operating with less power consumption than known systems.

The present invention is featured in the provision of a system employing a conventional shadow-mask multi-color cathode ray tube having respective red, blue, and green writing beam generation means each with an associated video amplifier. A stroke writing generator of conventional type is employed to effect predetermined horizontal and vertical deflection increments of the cathode ray tube beams, and means are employed operating in synchronism with the stroke writing generator to effect selected turn-on permutations of the associated red, green and blue video amplifiers during predefined deflection increment sequences, such that the displayed symbology may be selectively color coded.

Figure 2:
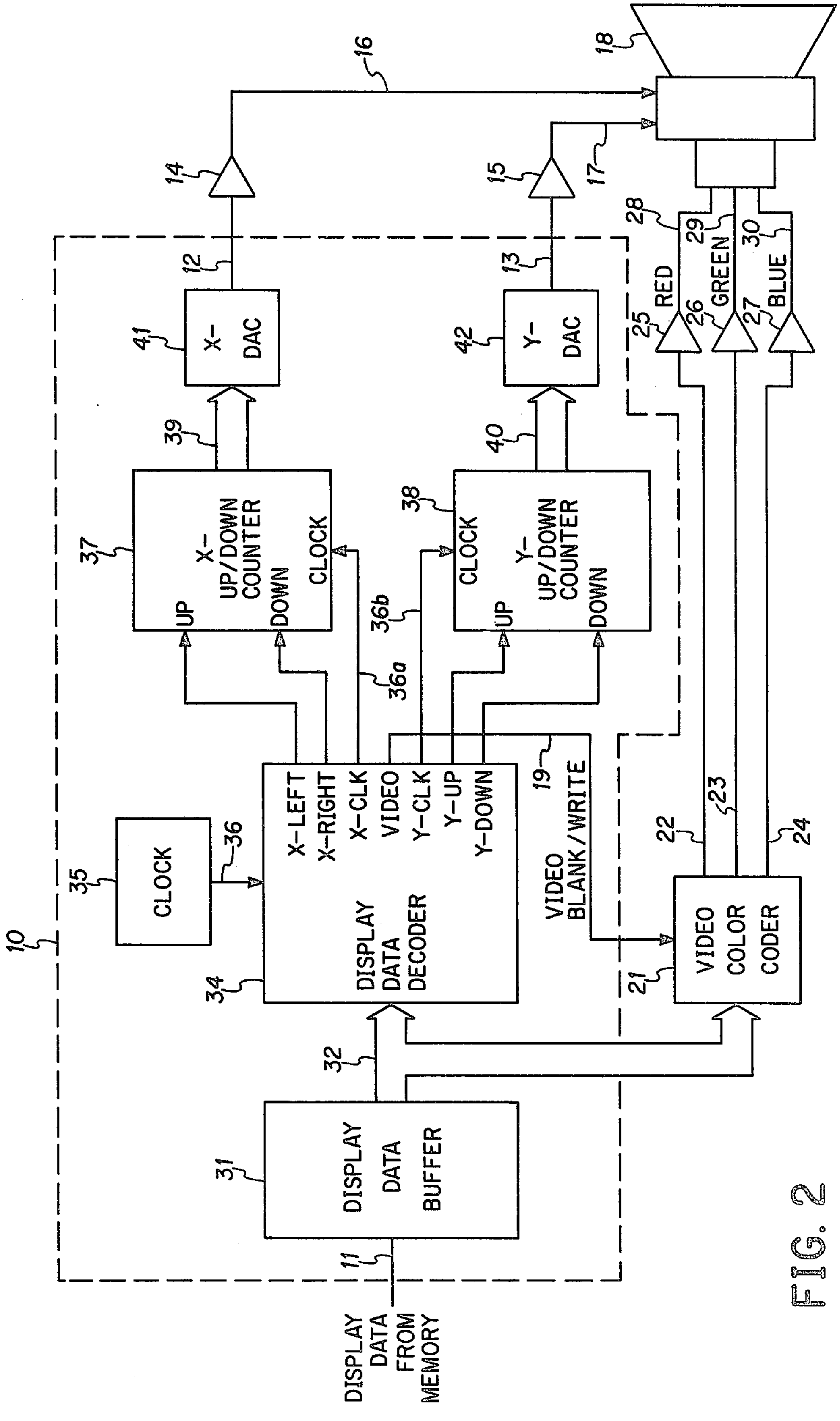
Figure 3:
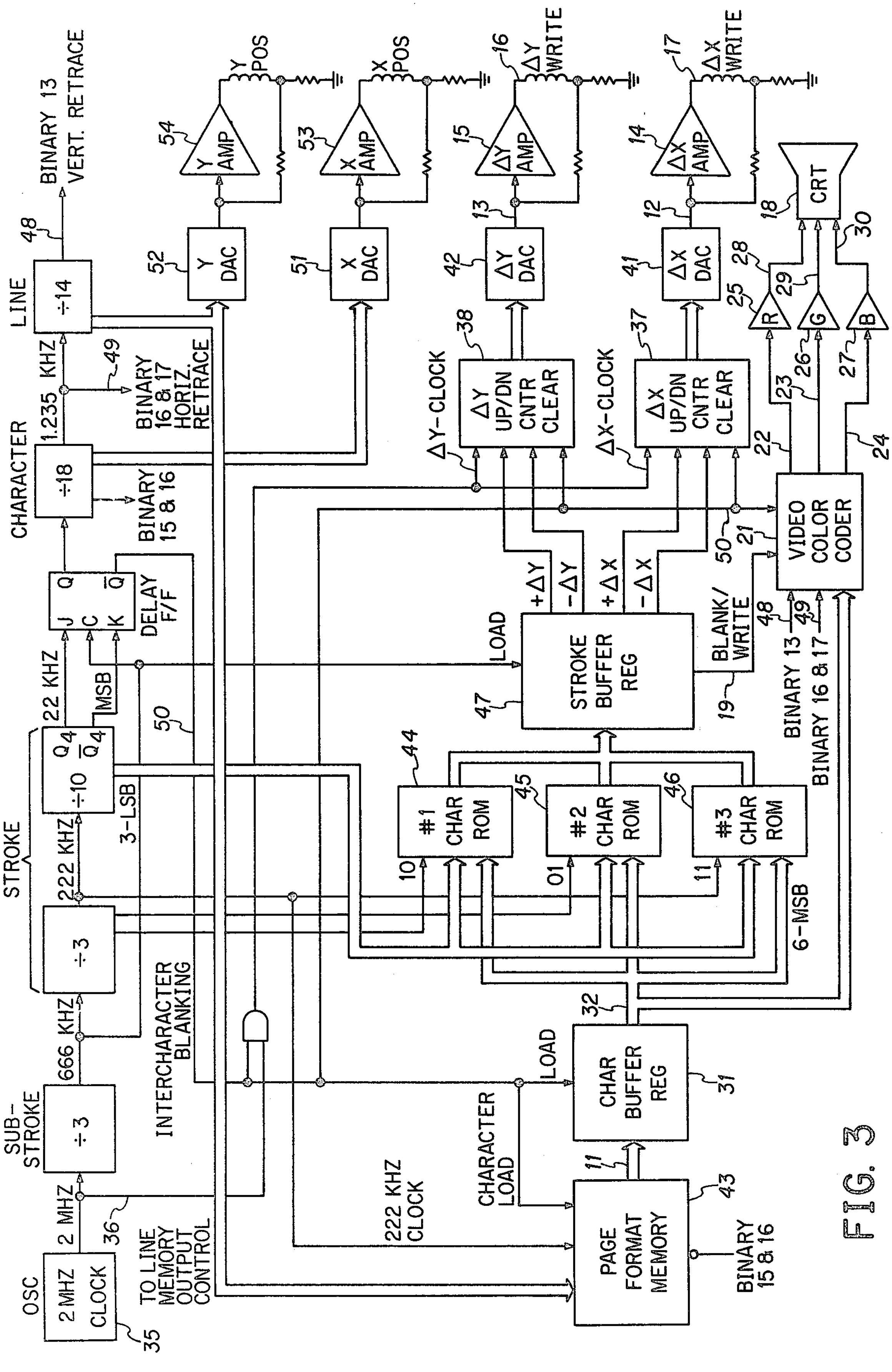
Figure 4:
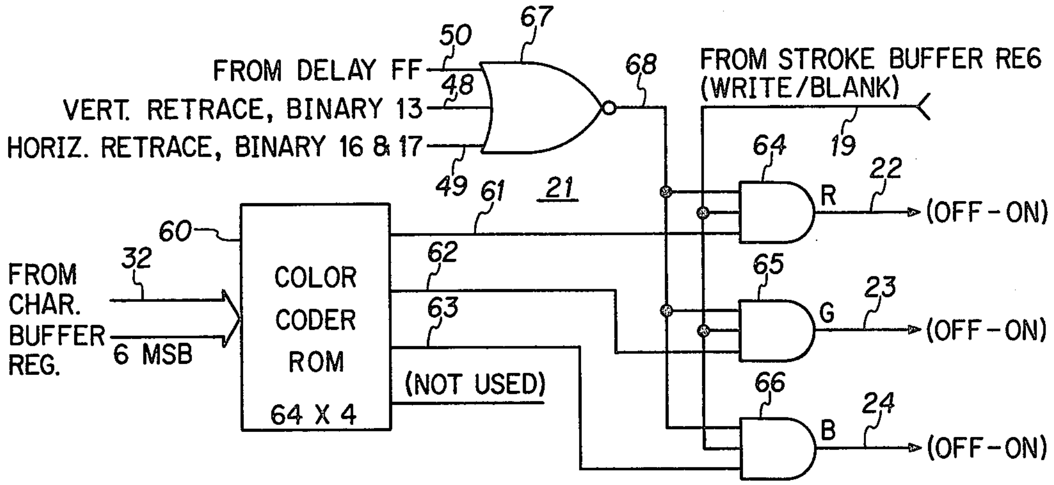
Figure 5:
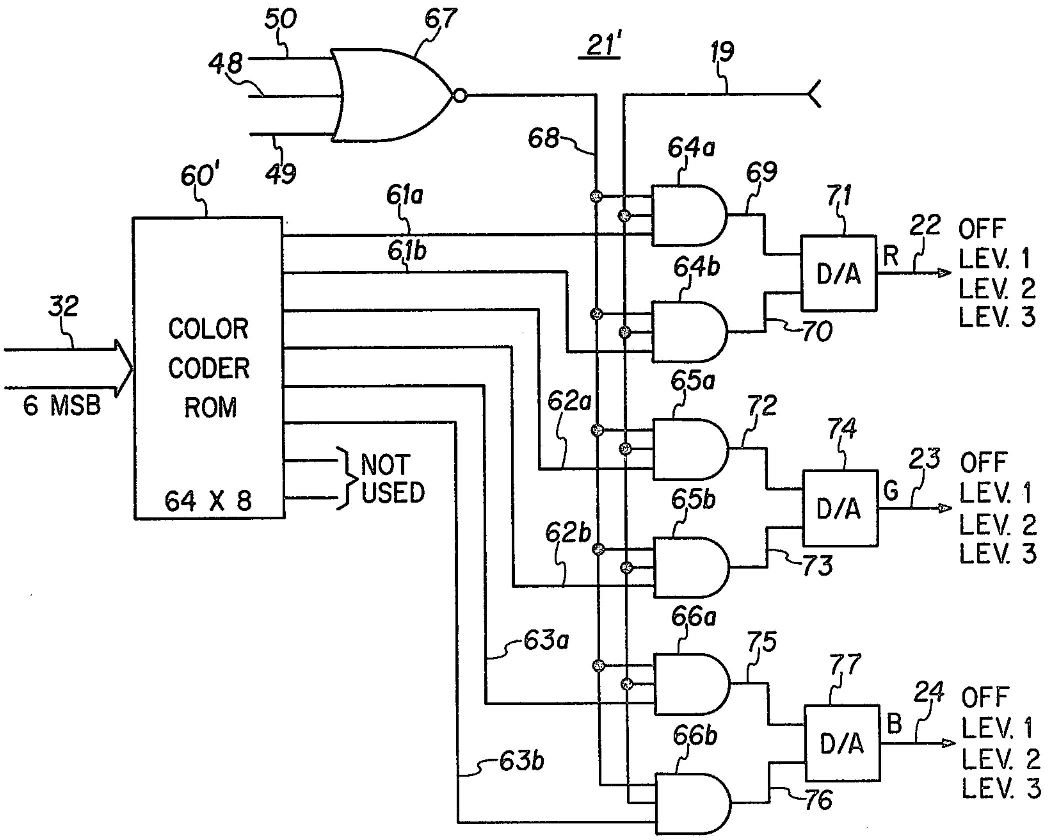

These and other features and objects of the present invention will become apparent upon reading the following description, with reference to the accompanying drawings, in which;

FIG. 1 represents a generalized functional block diagram of a system for displaying stroke written symbology on a shadow-mask multi-color cathode ray tube;

FIG. 2, a functional diagram of a stroke writing deflection system or stroke writing generator and its synchronous relationahip with a video color coder effecting a color selection of displayed symbology;

FIG. 3, a detailed functional block diagram of an exampled known stroke writing deflection generator means in conjunction with synchronized color coding control in accordance with the present invention;

FIG. 4, a functional diagram of a video color coder as may be employed in the system of FIG. 3; and FIG. 5, a functional diagram of an alternate video color coder as may be employed in the system of FIG. 3.

With reference to the drawing, FIG. 1 shows a generalized system implementation of a stroke writing system employing a shadow-mask multi-color cathode ray tube. The system is basically comprised of a conventional stroke writing generator 10, which might comprise any number of known stroke writing generators known in the art, and, for the purposes of the present invention, may comprise a system such as described in my U.S. Pat. No. 3,775,760 entitled "Cathode Ray Tube Stroke Writing Using Digital Techniques", the teachings of which are incorporated herein by reference. The stroke writing generator described in my U.S. Pat. No. 3,775,760, in common with other known stroke writing generators, responds to a digital input/output control line 11 to develop respective horizontal and vertical deflection signals 12 and 13 which are collectively definitive of cathode ray tube beam deflection to write a selected symbology as might be defined or commanded by the input/output line 11 to the stroke writing generator. Horizontal and vertical deflection signals 12 and 13 are conventionally applied to associated horizontal and vertical deflection amplifiers 14 and 15 the outputs 16 and 17 of which are respectively applied to the horizontal and vertical deflection coils of a cathode ray tube to effect beam deflection such that the beam traces out a given symbology to be written on the face of the tube. As will be further described with respect to the monochrome stroke writing generator of my U.S. Pat. No. 3,775,760, the stroke writing generator, in addition to the horizontal and vertical deflection signal outputs, provides a video output control line 19 which is effective in controlling the video signal applied to the cathode ray tube 18 to selectively turn the beam on or off as may be required to realize the drawing of a particular symbology on the cathode ray tube. In accordance with the present invention, in addition to developing horizontal and vertical deflection signals to effect beam deflection to write a particular symbology, the stroke writing generator 10 provides a color code output 20 which, as will be further described, defines the color of the information being written on the cathode ray tube. The color code output on line 20 may be controlled by data received over the input/output line 11 or by preprogrammed definitions in the stroke writing generator per se. The video control line 19 and color code control line 20 are applied to a video color coder 21 which develops respective control outputs on lines 22, 23 and 24 to effect turn-off and turn-on control of respective red, green and blue video amplifiers 25, 26 and 27. The outputs 28, 29 and 30 from the respective color video amplifiers are applied in conventional manner to the shadow-mask multi-color cathode ray tube 18 for control of the red, green and blue electron beams generated by the tube. In general, the system depicted in FIG. 1 develops horizontal and vertical deflection signals which are linearly amplified and fed to the cathode ray tube deflection yoke. All three beams of the cathode ray tube are thereby deflected simultaneously and uniformly as described by the horizontal and vertical deflection signal outputs from the stroke writing generator. Video control and color control data are fed from the stroke writing generator 10 to the video color coder 21 which distributes the video information to the three video amplifiers in a manner presented by the color code signal to effect the color tinting of the symbology being displayed on the CRT. Preselected color tinting for a particular symbol to be stroke written, or for a particular portion of a symbol to be stroke written, as desired, may be encoded into storage means synchronously addressed by the stroke writing generator circuitry to control the red, green and blue video amplifiers driving the cathode ray tube color beams.

The present invention, as generally embodied with the stroke writing generator of my above-referenced patent, is functionally depicted in FIG. 2. Data to be displayed, as it appears on input output line 11, is transferred to a display data buffer 31. Buffer 31 addresses, through paralleled output lines 32, a display data decoder 34, and thus defines the graphics/symbology to be displayed. A clock 35 supplies a master timing input 36 to the display data decoder 34 to sequence the display data decoder in orderly fashion through routines necessary to generate the appropriate signals to fulfill the command from the display data buffer 31.

The display data decoder 34, which might comprise one or more read-only memories (ROMS), is depicted as generating seven discrete signals, identified as:

1. Deflect beam left.
2. Deflect beam right.
3. Deflect beam up.
4. Deflect beam down.
5. Vertical clock rate.
6. Horizontal clock rate.
7. Video (write/blank on CRT).

The first six signals of the above discrete list are generally utilized to command vertical and horizontal up/down counters depicted as X-UP/Down counter 37 and Y-Up/Down counter 38. The outputs 39 and 40 from the respective counters are processed by respective digital to analog converters 41 and 42, depicted as X-DAC and Y-DAC respectively. The digital-to-analog converters 41 and 42 convert the moving digital deflection codes as applied from the respective counters to incremented/decremented analog X and Y beam deflection signals. The video signal 19 from the display data decoder 34 commands the write/blank circuits of the multi-color shadow-mask cathode ray tube 18 synchronously with the X and Y deflection signals. As described in detail in my above-referenced patent, the X-clock and Y-clock outputs, 36*a* and 36*b*, are depicted in FIG. 2 as applied clock inputs to the respective X and Y up/down counters, and determine the relative rates at which the counts in the respective counters increase or decrease during the time duration of left-right and up/down commands applied, and thus collectively may define the slope of a straight-line segment which may be traced on the cathode ray tube.

Outputs 12 and 13 from the respective digital-to-analog converters 41 and 42 are shown in FIG. 2 as being applied to associated deflection amplifiers 14 and 15 which develop respective X and Y deflection signals 16 and 17 for application to the horizontal and vertical deflection coils of the cathode ray tube 18.

As will be further described, and, as depicted generally in FIG. 2, the command output 32 from the display data buffer 31, which is effective in development of X and Y deflection voltages to write a selected symbology, is additionally applied as input to video color coder 21. The video blank/write output 19 from the display date decoder 34 is also applied to video color coder 21. Color defining code outputs on lines 22, 23 and 24 from the video color coder 21 are applied to respective red, green and blue video amplifiers 25, 26 and 27, outputs 28, 29 and 30 of which are applied to the cathode ray tube 18 to control turn-on of the respective red, green and blue beams in the shadow-mask multicolor CRT 18.

In general then, FIG. 2 depicts the development of horizontal and vertical deflection signals commanded in such a fashion as to cause the three beams in CRT 18 to be simultaneously deflected to effect the writing of a particular symbology as commanded by input data on line 11. The buffer 31 outputs a command signal 32 (for example, an address) which causes the display data decoder 34 to output a sequence of eight-bit words to effect the necessary video control and X and Y beam deflections to cause a particular symbology to be written on the CRT. The address or command 32 from the display data buffer, in turn, is applied to the video color coder 21 to synchronously develop video amplifier control signals in a selected permutation to define the color of the symbology being written.

FIG. 3 illustrates the tie-in of the video color coder 21 and video amplifiers 25, 26 and 27 with a more detailed functional diagram of the stroke writing generator 10. A detailed description of the functioning of the stroke writing generator 10 will not be included herein, reference being made to my U.S. Pat. No. 3,775,760 for a detailed description thereof. For the purpose of the present invention, the stroke writing generator develops X and Y deflection signals to effect stroke writing of characters and provides a means of synchronously tying in a video color coder 21 to effect the writing of selectively colored symbology on multi-color shadow-mask cathode ray tube 18.

As defined in my above-referenced patent, and functionally illustrated in FIG. 3, the stroke writing generator 10 provides for the display of sixty-four alphanumeric characters. A digital clock-controlled master timing system causes the beam to be positioned to predetermined successive start positions for each one of successive characters to be displayed. From each start position, the X and Y counters are commanded to cause the beam to follow a particular stroke sequence assigned to the character. The digital master timing system further effects necessary video blanking between characters, between the end of one line of characters and the beginning of a succeeding line of characters, and between the last character of the last line of the display and the repeat of the display sequence at the first character position of the first line of the display. Of significance to the present invention, is that the stroke writing generator 10 develops, on certain control lines, information which controls blanking of the video beam, and, in the instant invention, necessitates simultaneous blanking of all three of the color beams. The stroke writing generator of my previously referenced patent may thus be utilized essentially in its entirety, in conjunction with the video color coding arrangement herein described.

The stroke writing generator depicted in FIG. 3 is a digitally controlled system for the display of sixty-four alphanumeric characters, each character defined by a maximum of twenty-four sequential beam stroke commands. Each of the twenty-four beam strokes is, in turn, defined by clock incremented or decremented counts carried in each of X and Y counters the outputs of which are converted to analog beam deflection signals. The stroke writing generator 10 employed in the embodiment of FIG. 3 includes a read-only memory means which may be addressed to supply the twenty-four stroke segments stored therein for the addressed one of sixty-four characters in the writing repertoire. X and Y counters are supplied inputs at a common system clock rate and caused to count up, count down or maintain status quo by $\pm\Delta X$ and $\pm\Delta Y$ input commands defined by the twenty-four stroke segments stored for a selected character.

The stroke writing generator further comprises a master timing means comprised of digital dividers operated in cascade fashion under control of the master clock to provide X and Y beam start-position signals necessary to move the beam to a new starting point for each successive character to be written on a given line, and to cause the sequential characters to be conventionally displayed line by line. This portion of the stroke writing generator is significant to the instant invention only in that certain binary counts developed in the master timing generator generally depicted in the upper portion of FIG. 3 define periods when the video should be blanked, as during horizontal and vertical retrace intervals, etc. defined by the particular line and page format for which the stroke writing generator is designed. It is to be emphasized that no one particular kind of stroke writing generator is necessary as concerns the instant invention, since all stroke writing generators operate on the basis of some timing control, including, in most instances, requirement for video blanking. In the instant invention, blanking requirements must be utilized to shut off the three beams in the cathode ray tube for the same purpose as they would cut off the single beam in a monochrome display.

FIG. 3 depicts a page format memory 43 as supplying an input 11 to a character buffer register 31. Character buffer register 31 represents an implementation of the display data buffer 31 depicted in the general system of FIG. 2. Page format memory 43 might comprise any one of a number of memory implementations by means of which a predetermined "page" to be displayed is stored, together with timing and control means to synchronize readout of the stored page of information with the character and line positions on the cathode ray tube display. Thus memory 43 might comprise an input keyboard along with a read-in and read-out control circuitry to control a line memory with associated input and output controls and a line memory clock control. The output 11 from the memory 43 may, for purposes of this description, be considered to be comprised of a source of sequential parallel six-bit character addressing words which are time synchronous with character and line positions of the display. Thus the output 11 from memory 43, for any given character to be displayed, would comprise six parallel binary bits which would be effective in addressing $2^6$ or sixty-four different character words in the ensuing character memory portion of the display circuitry. The output 32 from character buffer register 31 would thus be comprised of a sequence of paralleled six-bit character address words related to the sequence of characters to be displayed, that is, a discrete six-bit address which is outputted on line 32 and uniquely present thereon during the writing of a character defined by that address.

The display data decoder 34 of FIG. 2 is embodied in the system of FIG. 3 as a read-only memory means which, in response to each six-bit character address present on character buffer register output line 32, initiates a sequential output of twenty-four character defining stroke words, each stroke of which is comprised of five bits ($\pm X$ deflection, $\pm Y$ deflection, and video on/off). The read-only memory means in FIG. 3 is embodied as three character defining ROM's 44, 45 and 46 which, under control of the master timing generator depicted in the upper portion of FIG. 3 and the particular character address present on the output 32 from character buffer register 31 collectively cause eight-bit segments of stroke defining command words to be sequenced through the ROM's 44, 45 and 46. Outputs from each of the character defining ROM's are OR'd as a common input to a stroke buffer register 47, with the stroke buffer register 47 providing the previously described $+\Delta Y$, $-\Delta Y$, $+\Delta X$, $-\Delta X$ and video blank/-write command words outputs which define the writing of the character. Outputs from the stroke buffer register are applied to the $\Delta Y$ up/down counter 38 and $\Delta X$ up/down counter 37 in the form of commands which either increment, decrement or hold the existing count. The running counts held in the $\Delta X$ and $\Delta Y$ counters are applied through digital-to-analog converters 41 and 42 outputs 12 and 13 of which are applied to respective $\Delta X$ and $\Delta Y$ deflection amplifiers 14 and 15 to supply analog deflection signals 16 and 17 to the cathode ray tube deflection coils.

Again it is to be emphasized that, for the purposes of the present invention, the particular read-only memory means and addressing technique employed in the system of FIG. 3 (as described in detail in my above-referenced patent) are not in and of themselves significant to the present invention. Of significance to the present invention is that the output 32 from character buffer register 31, in the form of an address uniquely definitive of a particular character being written at any particular time, provides a ready means for synchronizing and selecting a particular color which may be desired for that character. To this end, output 32 from character buffer register 31, in addition to being applied to the read-only memory means to effect the deflection signals for writing the character, is applied as an input to the video color coder 21, which, as will be further described, may provide means to effect a desired (programmed) video amplifier turn-on permutation for the duration of the writing of the character defined by the address on line 32. Note in FIG. 3 that the video color coder 21 receives an additional input 19 (the write/-blank command bit from the stroke writing buffer register 47). This bit will be utilized to turn off all beams in the cathode ray tube for certain retraced portions which may be defined in the writing of a given character. As described in my above referenced patent, these retrace portions (sequences where the beam is caused to deflect back over a portion of a symbol) would cause uneven character brightness were the beam not blanked during such retrace portions. Video color coder 21 in FIG. 3 further receives an input 48 defined as "binary 13" which comprises an output from the master timing generator of FIG. 3 corresponding to vertical retrace time in the page writing format of the particular stroke writing generator employed. Video color coder 21 additionally includes an input 49 defined as "binary 16 and 17" which comprises a binary control waveform unique to the master timing generator of the system of FIG. 3 during which horizontal retrace in the format is occurring, and during which period of time it is desired to blank the video. Again, as concerns the present invention, the particular unique video blanking inputs to the video color coder 21, as applied in the particular embodiment of FIG. 3, are not by way of limitation. It is noted that inputs 19, 48 and 49 to the video color coder each have in common a singular purpose, that of effecting a desired blanking of the cathode ray tube beams. A still further input 50 to the video color coder 21 of FIG. 3 comprises a particular binary level output from a delay flip-flop in the master timing chain of the system which input (as described in my above-referenced patent) is utilized to effect beam turnoff for a discrete interval of time during respositioning of the beam from the end writing position of one character to the start position of a succeeding character to be written. Thus input 50 to video color coder has, in common with other control inputs, that of commanded video beam turnoff in the system.

The particular stroke writing generator implementation of FIG. 3, embodying that described in my above-referenced patent, developes beam positioning X and Y deflection signals for the start of characters to be written, as well as character writing X and Y deflection signals which are applied to separate respective pairs of deflection coils. For the purposes of the invention, this particular implementation is not limiting or necessary. For example, the outputs from the X and Y digital-to-analog converters 51 and 52 of FIG. 3, as applied to X and Y amplifiers 53 and 54, might be applied as respective offset inputs to the ΔX and ΔY deflection amplifiers 14 and 15 of FIG. 3.

With reference to FIG. 4, a one-bit resolution video color coder 21 is embodied, whereby each of the red, green and blue video amplifiers 25, 26 and 27 may be controlled on an on-off basis to effect color tinting of the written symbology.

The video color coder 21 of FIG. 4 comprises a color coder ROM 60 which receives the six-bit character address from the character buffer register 31 of FIG. 3. The six-line address on input 32 is thus capable of having developed thereon, for the particular sixty-four character repertoire capability of the described stroke writing generator, $2^6$ or sixty-four discretely different addresses. Color coder ROM 60 might be implemented as a 64×4 ROM having stored therein, at sixty-four discretely addressable positions, a four-bit color code word. For the purpose of the three video amplifiers herein being controlled, only three of these bits are used as they appear on output lines 61, 62 and 63, and may comprise a binary "1" on a particular line when it is desired to turn on a particular color video amplifier controlled by that line. Video amplifier turn-on/turn-off control is effected in FIG. 4 by the respective outputs 22, 23 and 24 from AND gates 64, 65 and 66 to which the output line 61, 62 and 63 from the color coder ROM are applied as respective first inputs. AND gates 64, 65 and 66, together with a NOR gate 67, comprise an enabling logic gating circuitry which, as previously briefly described, effects simultaneous blanking of all three cathode ray tube beams during particular intervals unique to the particular stroke writer employed. A second input to each of the AND gate 64, 65, 66 comprises the write/blank line 19 from stroke buffer register 47. Line 19 is false when the particular stroke writing command readouts call for video blanking, and it is seen that no logic "1" outputs may appear on lines 22, 23 and 24 from associated AND gates 64, 65 and 66 should line 19 be false. Additionally, particular logic level inputs from the stroke writer embodied in FIG. 3 provide for a third input to each of the AND gates 64, 65 and 66. Line 50 (the $\overline{Q}$ output from the delay flip-flop in the timing generator of FIG. 3), line 48 (corresponding to a vertical retrace time period in the page format of the stroke writer) and line 19 (corresponding to the horizontal retrace period of time unique to the stroke writer) are applied as respective inputs to NOR gate 67 the output 68 of which comprises a third input to each of the AND gates 64, 65 and 66. Inputs 50, 48 and 49 to NOR gate 47, for the particular stroke writer embodiment herein described, are true when blanking of video is called for. Thus output line 68 from NOR gate 67 is false when blanking is called for. In the presence of a blanking (true) signal appearing on either of lines 50, 48 or 49, line 68 is false and precludes development of true outputs on the video amplifier control output lines 22, 23 and 24.

In operation, assume the address on input line 32 to the color coder ROM 60, corresponding to a particular symbology to be drawn, selects a color code output word from color coder ROM 60 whereby line 61 is true and lines 62 and 63 are false. In response to this color code output, AND gate 64 developes a true output on line 22 to turn on the red video amplifier of FIG. 3, and the particular symbol being drawn will be displayed in red. Permutations of video amplifier turn-on are defined by different three-bit color code words as addressed from ROM 60. Thus the system of FIG. 4 permits $2^3$ selective turn-on permutations of the three video amplifiers which control the beams of cathode ray tube 18, and the off-on control effected by the system of FIG. 4 permits a particular symbol being drawn to be displayed in green only, red only and blue only by turning on only that one of the three video amplifiers. In addition, all three video amplifiers may be commanded to be turned on and the symbol be written in white. A commanded turn-on of the green and the blue effects writing of the symbol in cyan and a turn on of the red and the blue video amplifiers effects a writing of the symbol in magenta. Thus, the simple one-bit video amplifier control (either on or off) afforded by the system of FIG. 4 permits preselected writing of particular symbols in any one of seven colors, in addition, of course, to complete beam turnoff (black).

While the range of color concerning written symbology made possible by the one-bit resolution system of the video color coder of FIG. 4 may be sufficient for a number of display applications, the video color coder may be expanded as desired to include multi-level turn-on of each of the red, green and blue video amplifiers. With reference to FIG. 5, a further embodiment of the video color coder 21 of the system of FIG. 3 is shown, wherein each video amplifier may be controlled by a two-bit command word, making possible the control of each video amplifier to the off state and a selected one of three levels of on-state. Tintings and shades of the colors made possible by the one-bit system of FIG. 4 may then be attained. With reference to FIG. 5, video color coder 21 is embodied in a manner similar to that of FIG. 4, with the color coder ROM 60' expanded so as to include two bits for each of the colors red, green and blue. Color coder ROM 60', as depicted in FIG. 5, might consist of a 64×8 ROM with two bits not used, leaving three pairs of output bits for respective control of the three video amplifiers. Color code ROM 60', in response to an input address on line 32 corresponding to a symbol to be drawn, outputs a selected eight-bit color code word. Bits **61*a* and 61*b* are applied as respective first inputs to a pair of AND gates 64*a* and 64*b* outputs of which are applied to a digital-to-analog converter to develop an output control for the red video amplifier which may command that the amplifier be off or operating at one of three commanded levels. The AND gate pair 64*a*–64*b* receives blanking definitive inputs in a fashion similar to that of FIG. 4. Thus AND gate pair 64*a*–64*b*, in the absence of a system defined requirement for video blanking (as for retrace, etc.), develop outputs on respective lines 69 and 70 which collectively comprise two-bit words of 00,01,10, or 11 depending upon the encoding of the addressed color code word in ROM 60'. AND gate outputs 69 and 70 are applied to a digital-to-analog converter 71 the output 22 of which is applied to the red video amplifier, and may be at a zero level or any one of three discrete levels to command that the red video amplifier either be off or generating a red beam at one of three levels. Similarly, output pair 61*a*–62*b* from the color code ROM comprise respective first inputs to a further AND gate pair 65*a*–65*b* associated with the green video amplifier, and outputs 72 and 73 from this AND gate pair again, depending upon the word encoded in ROM 60' at the addressed location, collectively define a two-bit control word. Outputs 72 and 73 are applied to a digital-to-analog converter 74 the output 23 of which is employed to control the green video amplifier to either an off state or a commanded one of three "on" levels. Similarly, output bit pair 63*a*–63*b* from color code ROM 60' is applied as respective inputs to AND gate pair 66*a*–66*b* respective outputs 75 and 76 of which are applied to digital analog converter 77 to develop an output 24** for control of the blue video amplifier to either the off state or a commanded one of three "on" levels.

Obviously, the color code approach above-described with reference to FIGS. 4 and 5 might be expanded as desired to effect a greater number of controlled levels of the three color video amplifiers towards approaching a full spectrum control of color as concerns the symbology being stroke written.

The present invention provides a stroke written shadow-mask multi-color cathode ray tube display system. The system herein described embodies a conventional stroke writing generator (embodied as that described in my U.S. Pat. No. 3,775,760), conventional linear deflection amplifiers, conventional red, green and blue video amplifiers, a conventional shadow-mask multi-color cathode ray tube as widely employed in the television industry, a conventional deflection yoke, and a video color coder. The stroke writing generator receives graphical and/or symbolic data over input/output lines. This data is processed into conventional stroke written deflection and video signals. In addition, a color code is generated which defines the color of information being written on the cathode ray tube and is synchronously controlled in conjunction with the stroke writing process by either or both data received over the input/output line or preprogram definitions in the stroke writing generator. All three beams of the cathode ray tube are deflected simultaneously by the X and Y deflection signals developed by the stroke writer, with video and color code data being fed from the stroke writing generator to the video color coder. The video color coder distributes the video information to the three video amplifiers associated with the color cathode ray tube in a manner commanded by the color code signal to effect the color tinting of the stroke written symbology.

The particular embodiment herein described utilizes the particular stroke writing generator defined in my above-referenced patent, wherein an address is present in the stroke writer which is uniquely associated with a particular character being written, and the embodiment of the color stroke writing system utilizes this address to effect a particular tint of the character defined by that address. It is to be realized that various other color control arrangements might be employed. For example the stroke writer might comprise a symbol generating device capable of drawing lines, circles, tracing out a labeled map display, etc. The teachings of the present invention extend to any type of stroke writing generator by scynchronous tie-in with a video color coder, such that selected symbols or portions of symbols in any desired form may be tinted in accordance with a predefined color.

Thus, although the present invention has been described with respect to a particular embodiment thereof, it is not to be so limited, as changes might be made therein which fall within the scope of the present invention as defined in the appended claims.

What is claimed is:

1. In combination: a multi-color, shadow-mask cathode ray tube including means for generating plural electron beams; a plurality of video amplifier means each associated with an individual one of said plural means for generating; a stroke-writing deflection signal generating means, means for simultaneously controlling deflection of said plural electron beams in response to the output of said deflection signal generating means, and color code means operable in synchronism with said deflection signal generating means to effect selected turn-on permutations of said plurality of video amplifier means.

2. In a display system including a shadow-mask multicolor cathode ray tube, means for generating running digital counts respectively definitive of horizontal and vertical deflection signals to trace out a predetermined symbology on said cathode ray tube, means applying said deflection signals to respective horizontal and vertical deflection coils of said cathode ray tube, each of said running digital counts being selectively incremented and/or decremented at a clock defined rate, and means operable in synchronism with said clock defined bit rate so selectively effect turn-on permutations of respective video amplifiers driving associated electron beams in said cathode ray tube.

3. A display system as defined in claim 2, wherein said means for generating said deflection signal comprises means for storing binary deflection command words, and means for addressing selected sequences of said command words to develop said selectively incremented and/or decremented horizontal and vertical deflection signals; and with said system comprising color code generating means responsive to said means for addressing to develop selected binary color code defining outputs to said video amplifiers.

4. The display system of claim 3, with said means for storing including means for storing color code defining digital command words at discrete addressable addresses, said means for addressing comprising means to effect readout of preselected ones of said color code command words during intervals defining selected pluralities of addressed ones of said deflection command words.

5. In combination; a shadow-mask multi-color cathode ray tube having respective red, blue and green writing beam generation means each with an associated video amplifier, a stroke writing generator means to effect predetermined horizontal and vertical deflection increments of said cathode ray tube beams, and means operable in synchronism with said stroke writing generator means to effect selected turn-on permutations of said associated red, green and blue video amplifiers during predefined beam deflection increment sequences as effected by said stroke writing generator means.

6. The combination of claim 5, with said stroke writing generator means comprising command logic signal generation means to effect cathode ray tube beam turnoff during predetermined beam deflection increment sequences, and logic gating means responsive to command logic signals to selectively preclude said turn-on pemutations of said video amplifiers.

7. The combination of claim 6 with said stroke writing generator means comprising means for addressing to effect a predetermined sequential readout of a stored first plurality of digital command words each having m-bits effecting incrementing and/or decrementing of horizontal and vertical deflection signals applied to said cathode ray tube, said sequential readout collectively effect writing of a predefined symbology on said cathode ray tube, and said means for addressing further efficiency readout of a stored second plurality of digital command word each having n-bits defining red, green, blue video amplifier turn-on permutations for that sequential readout, and said n-bit command words being applied to said logic gating means.

8. The combination of claim 7, with said sequences of m-bit words defining contiguous writing segments of a selected symbol to be displayed, said addressing means responsive to a symbol assigned address to effect sequential read-out from siad first storage means of said m-bit words defining that symbol and a readout of a selected one of said n-bit color definitive words to define a preselected display color for said symbology defining sequence.

9. The combination of claims 7 or 8 with said n-bit words comprising at least three bits respectfully definitive of turn-on of said red, green and blue video amplifiers.

10. The combination of claims 7 or 8 with said n-bit words comprising a plurlaity of bits for each of the colors, red, green, and blue, with the plurality of bits for each color being definitive of multi-level intensity turn-on of the associated one of said video amplifiers.

11. The combination of claim 10, with said plurality of bits for each of said colors applied to an associated digital-to-analog conversion means the output of which is applied to the video amplifier associated with that color.

* * * * *

REEXAMINATION CERTIFICATE (1231st)

United States Patent [19] | [11] B1 4,200,866

Strathman | [45] Certificate Issued Apr. 3, 1990

[54] STROKE WRITTEN SHADOW-MASK MULTI-COLOR CRT DISPLAY SYSTEM

[75] Inventor: Lyle R. Strathman, Cedar Rapids, Iowa

[73] Assignee: Rockwell International Corp, El Segundo, Calif.

Reexamination Request:
No. 90/001,292, Jul. 27, 1987

Reexamination Certificate for:

Patent No.: 4,200,866
Issued: Apr. 29, 1980
Appl. No.: 885,843
Filed: Mar. 13, 1978

[51] Int. Cl.[4] .................... G09G 1/28

[52] U.S. Cl. .................... 340/703; 315/367; 340/739; 340/740

[58] Field of Search .................... 340/701, 703

[56] References Cited

U.S. PATENT DOCUMENTS

| | | | |
|---|---|---|---|
| 3,471,847 | 10/1969 | McCollough et al. | 340/701 X |
| 3,577,031 | 5/1971 | Welsh et al. | 315/368 |
| 3,627,912 | 12/1971 | Hearn . | |
| 3,668,686 | 6/1972 | Strohmeyer | 340/720 X |
| 3,775,760 | 11/1973 | Strathman | 340/740 |
| 3,786,483 | 1/1974 | Sinobad | 340/701 |
| 3,836,890 | 9/1974 | Arkell | 340/720 X |
| 3,891,889 | 6/1975 | Fazio | 315/368 |

*Primary Examiner*—David L. Trafton

[57] ABSTRACT

A stroke writing generator develops selectively incremented and/or decremented horizontal and vertical deflection signals which simultaneously deflect all color associated beams of a conventional shadow-mask multi-color cathode ray tube to cause the beams to trace out a selected symbology on the tube screen. A video color code generator, operating in clock-defined synchronism with the stroke writing generator, selectively effects turn on permutations of plural video amplifiers driving associated electron beams in the cathode ray tube to facilitate preprogrammed color tinting of the displayed symbology.

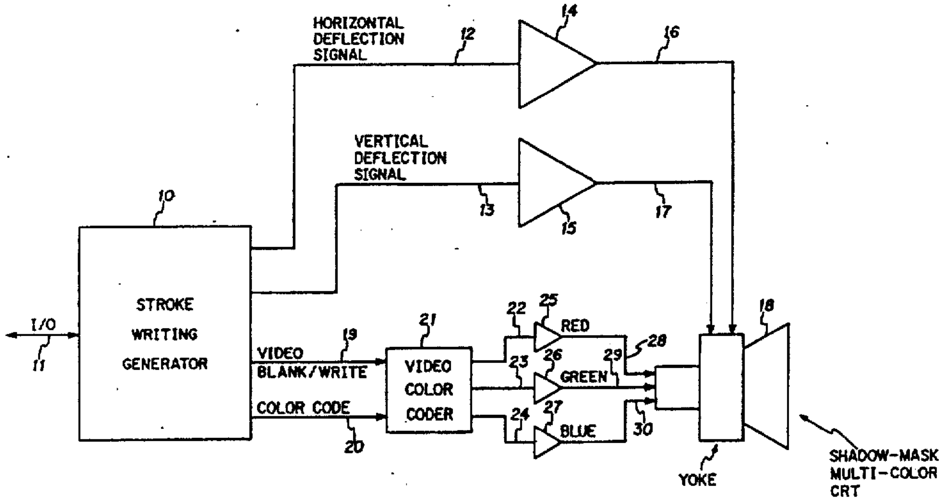

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *